Patented Nov. 19, 1940

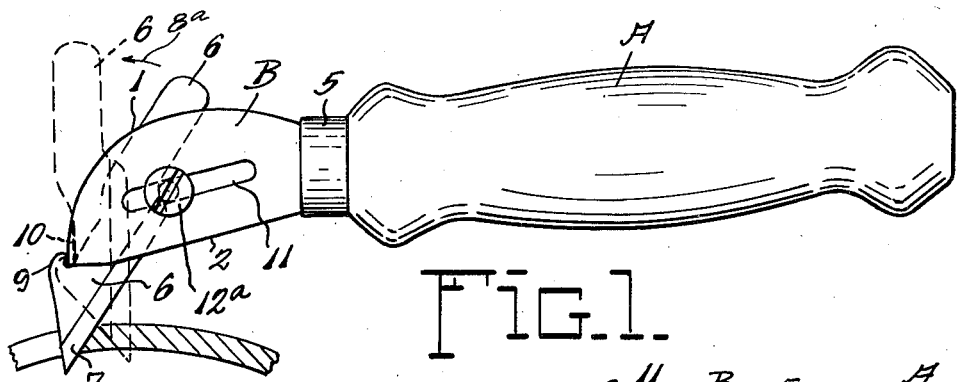
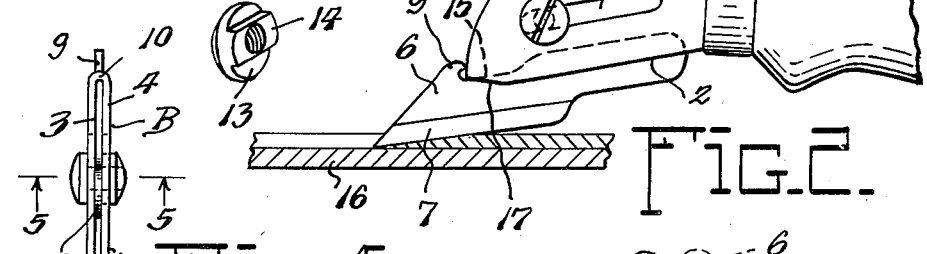
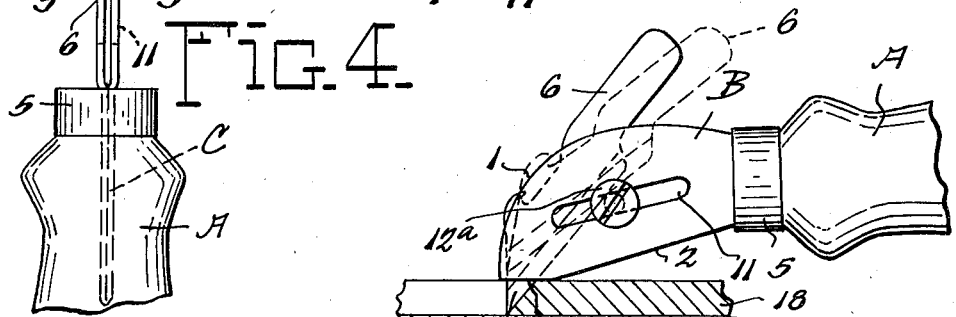
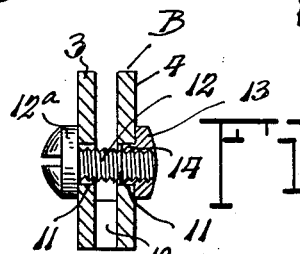
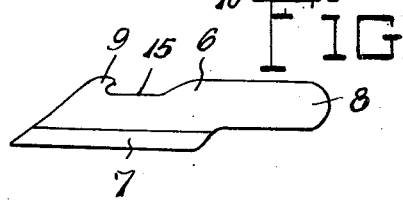
Inventor
RAYMOND R. WARD.
By *Robb & Robb*
ATTORNEYS.

2,222,328

UNITED STATES PATENT OFFICE 2,222,328

CUTTING TOOL OR KNIFE

Raymond R. Ward, Cleveland, Ohio, assignor to George W. De Wees, Cleveland, Ohio Application May 27, 1938, Serial No. 210,527

2 Claims. (Cl. 30—320)

The present invention embodies a simple cutting tool or device useful for cutting linoleum, rubber or composition tiles, Celotex, and similar artificial fiber boards or the like, and involves certain specific improvements in the invention of my copending application for patent Serial Number 181,836 filed December 27, 1937.

A cutting tool or device such as that of my invention embodies primarily a suitable handle, a blade holding member attached thereto, a blade adjustable in or on the holding member, peculiar formations of the blade and said holding member whereby these parts may be interlocked, have fulcruming movement relatively to each other, and the blade braced when the blade is mounted on and held in adjusted position relatively to the holding member.

The detail features of the present invention will become more fully apparent upon reference to the following description and to the accompanying drawing, in which:

Figure 1 is a side view showing a cutting tool embodying the invention, illustrating the blade or cutting member in one position as when cutting a strip of linoleum or the like, and showing the blade in dotted lines in a second position of adjustment useful for similar cutting operations.

Figure 2 is a view somewhat similar to Figure 1 with the handle of the tool partly broken away, illustrating the blade in another adjustment.

Figure 3 shows the blade in two other adjustments in the blade holder, one in full lines and the other in dotted lines, the full line position illustrating how the gauge edge of the blade holder is adapted to support the blade while the tool is performing a cutting operation so that the depth of the cut performed by the blade is measured by said gauge edge or portion, the dotted line position being one which the blade may occupy when the tool is out of use whereby to avoid likelihood of accidental cutting by the tool under such conditions.

Figure 4 is a top view showing the blade holder as well as the blade mounted therein and adjusted, the parts being arranged according to the illustration in full lines in Figure 1.

Figure 5 is a cross sectional view taken about on the lines 5—5 of Figure 4.

Figure 6 is a side view of the blade or cutting member alone and illustrating the shank portion thereof offset from the cutting edge.

Figure 7 is a detail perspective view of the nut which is used in connection with the screw bolt that fastens the blade or cutting portion in adjusted position in the blade holder.

Referring to the drawing, A denotes the handle of the cutting tool and B the blade holder which is of peculiar formation. Said holder is provided with a curved edge portion at its upper part, designated 1, and an almost straight edge 2 at its lower portion. The holder is made by bending upon itself a piece of flat sheet metal which is cut in the blank form to give the shape to the holder as above described. Near the outer extremity of the holder B the blank of metal from which it is made is bent upon itself and thus formed into two sides which are spaced from each other as shown clearly in Figure 4 at 3 and 4. At the inner extremities of the sides 3 and 4 said sides are tapered so as to provide a tang C which extends into the handle A beyond the ferrule 5 customarily provided for such tools.

The spaced apart sides 3 and 4 of the blade holder B are adapted to receive therebetween a blade or cutting knife 6 which is provided with a cutting edge 7, the shank 8 offset inwardly from the cutting edge and the fulcrum and hook member 9 which is disposed at the edge of the blade 8 opposite the knife edge 7. The sides 3 and 4 of the blade holder at the portion of the bend at the outer extremities thereof are connected by a web or abutment member 10 integral therewith and made out of the same blank of metal, therefore, as the entire member B.

The sides 3 and 4 of the blade holder B are furthermore slotted as shown at 11, and a screw bolt 12 passes through the slots of the members 3 and 4 and is equipped with a clamp nut 13 which is adapted to clamp the two sides 3 and 4 together in order to cause the same to frictionally bind against the knife blade 6 and thereby hold the latter at a desired adjustment. The metal from which the member B is made is resilient so that a certain amount of resiliency or spring movement of the parts 3 and 4 toward each other and to separate is afforded. This resiliency is taken advantage of by the action of the clamping bolt 12 and nut 13. As seen in Figure 7 the nut 13 is equipped with a rectangular lug 14 on its inner side, which lug is dimensioned to fit lengthwise in one of the slots 11, thereby to prevent turning of the nut as the bolt 12 is turned by application of a screw driver or the like to the head 12a of said bolt.

The blade 7 is formed peculiarly in that it is provided with a recess 15 in the edge portion opposite the cutting edge 7, the fulcrum and hook member 9 being provided at one end of the recess and the other end merging into the adjacent edge portion of the offset shank 8 previously referred to.

It is contemplated that the parts be mounted relatively to one another as shown in the several figures of the drawing which contain assembled views, and the adjustment of the blade or cutting member 6 is graphically depicted by the various views of the drawing.

It is probably unnecessary to specifically describe all of the adjustments, but by reference to Figure 1 it will be seen that in full lines the blade 6 is so arranged that its fulcrum member or hook 9 is seated against the outer face of the abutment member or web 10 that connects the sides 3 and 4 at their outer extremities. By the provision of the member 9 it will be seen that the hook portion may engage the end of the web or abutment 10 at the lower extremity thereof and a sort of interlock is thus established between the part 9 and the abutment which is effective to afford a rigid backing or bearing for the blade 6 as it is caused to move against the work subjected to the cutting action. This interlock phase of operation of use of the part 9 is shown by the full line arrangement and adjustment of the blade 6, as in Figure 1, and when the blade is desired to be disposed at substantially right-angles to the handle A, the edge of the blade remote from the cutting edge 7 may rest flat against the abutment 10 and the longitudinal movement of the blade in the holder B will be resisted in an upward direction by the interlock established between the parts 9 and 10. Figure 1 shows how linoleum or the like may be cut while raised off the floor or any base surface.

Figure 2 shows an arrangement of the blade 6 wherein the upper edge portion thereof alone is clamped between the parts 3 and 4 and the fulcrum member or hook 9 has a bearing against the outer surface of the abutment 10 in both a rearward and upward direction relatively to the holder B. In this instance the work, such as linoleum or fiber board, may be supported on a base 16.

Figure 3 exemplifies still another adjustment of the device, and to describe this adjustment best it may be noted that the lower edge portions of the members 3 and 4 are formed with flat extreme portions designated 17 which constitute gauge or guiding members since they are adapted to rest flat or parallel to the work, such as linoleum, wall board, or the like, that is being cut by the blade 6. In other words, the gauge or flat guiding portions 17 of the blade holder B are intended to be adjusted flat against the material subjected to the cutting action of the knife edge 7, and in Figure 3 the working portion of the knife edge which is projecting below the gauge parts 17 are intended to be slightly less in working length than the thickness of the material 18 that is shown as being cut by the use of the tool in the illustration of Figure 3. The linoleum or equivalent material 18 in this instance is supported upon a floor, we will say, designated 19, and by the proper adjustment of the extending working portion of the blade 6 it is contemplated that such portion is only cut the thickness of the material 18 to an extent that the cutting portion or edge 7 does not mar or engage the floor or base 19.

When the blade is used in the manner of Figure 2, it is obvious that the lower portion of the abutment 10 has a sort of interlocking action with the fulcrum and hook 9 and said member 10 has a bearing in an angular recess which is created by the disposition of the member 9 relatively to the recess 15.

Also in dotted lines in Figure 3 the blade 6 is illustrated as when it may be out of use, with the cutting portion thereof received and housed between the spaced sides 3 and 4 of the holder B. In this way the blade is tightly clamped in a non-working position and there is no likelihood of accidental cutting of the user in the handling of the tool when it is not employed for cutting purposes.

It should further be noted that the hook portion not only serves as an interlock in the manner referred to above, but also as a fulcrum assisting the adjustment of blade 6 from its full line position in Figure 1 to any other position it may assume when arranged within the holder structure as shown in Figure 1. In other words, and referring now to Figure 1, when it is desired to move the blade 6 from its full line position to the dotted line position, bolt 12 is loosened and the shank portion 8 is gripped and moved in the direction of the arrow 8a, thereby shifting blade 6 to dotted line position. During such movement the hook portion 9 of the blade 6 is held in engagement with the portion 10 of the member B, and obviously the parts 9 and 10 permit a fulcruming of the blade to the dotted line position. By reason of the provision of the offset shank portion 8 with respect to the blade proper, there is provided a shoulder at 8' which serves to minimize damage of the knife edge 7 by the clamping bolt 12 in the position of adjustment shown in full lines in Figure 1. In this position, the shoulder 8' indicates the approach of the clamping bolt 12 near the knife edge 7 upon being moved into engagement with the bolt 12. In addition, it will be apparent that the offset from the knife edge 7 providing the shoulder 8' enables a greater angular adjustment to be given the blade with a given length of slots 11 in view of the fact that the angular adjustment with the parts as shown in Figure 1 is determined by the fulcrum movement of the blade 6 and hook 9 about the abutment 10 into engagement with the bolt 12. The offset providing the shoulder 8' enables the blade to be tilted back into engagement with the bolt 12 to a position more nearly approaching a horizontal position for a given length of slots 11 than would be the case if the knife edge 7 extended in a straight line the entire length of the blade 6 without an offset providing the abutment 8'.

The above described fulcrum action assists the adjusting of the blade very considerably, in that it permits movement of the blade 6 to any desired angular position without disengaging parts 9 and 10 or removing the blade from the blade holder B.

Having thus described my invention, what I claim as new and desire to secure by Letters Patent of the United States, is—

1. A cutting tool of the class described, comprising a handle, a blade holder consisting of a piece of sheet metal bent upon itself to provide spaced sides formed with tang parts at one end to enter the handle, the bent portion of said sheet metal at the outer extremities of the said sides forming a web connecting the sides and constituting an abutment disposed generally transversely of the said sides of the blade holder, the sides of the blade holder being provided with slots therein, a clamping fastening passing through the slots, and a blade adapted to be received and clamped between the sides of the blade holder and formed with the knife edge at one edge portion, said blade having one end thereof offset from the longitudinal line of the knife edge to bear against the clamping fastening aforesaid and provided at its edge opposite the knife edge with a recess, and a hook member at the end of the blade opposite the shank and at one end of the recess, said hook member being adapted to engage the abutment of the blade holder.

2. A cutting tool of the class described, comprising a handle, a blade holder carried at one end by the handle, said blade holder including spaced sides connected at one end to the handle and interconnected to each other at their opposite ends by a web forming an abutment, a blade secured to the handle by the holder and having a cutting edge, said blade being formed with a hook-like fulcrum member forming a recess at the back of the blade to receive one end portion of the abutment aforesaid of the blade holder for interlocking the blade with the blade holder to afford a bearing between the parts where the hook member engages the abutment, and said blade being angularly adjustable in the holder while the hook-like fulcrum member is in engagement with the abutment.

RAYMOND R. WARD.